US012652128B2

(12) United States Patent
Van Der Tuijn

(10) Patent No.: US 12,652,128 B2
(45) Date of Patent: Jun. 9, 2026

(54) SYSTEMS AND METHODS FOR CONTROLLING RADIO FREQUENCY COMMUNICATION RECEIVERS

(71) Applicant: STMicroelectronics International N.V., Geneva (CH)

(72) Inventor: Roland Van Der Tuijn, Mouans-Sartoux (FR)

(73) Assignee: STMicroelectronics International N.V., Geneva (CH)

( * ) Notice: Subject to any disclaimer, the term of this patent is extended or adjusted under 35 U.S.C. 154(b) by 259 days.

(21) Appl. No.: 18/601,352

(22) Filed: Mar. 11, 2024

(65) Prior Publication Data

US 2024/0333430 A1     Oct. 3, 2024

(30) Foreign Application Priority Data

Mar. 30, 2023     (FR) ...................................... 2303076

(51) Int. Cl.
H04L 1/1607          (2023.01)
H04L 5/00          (2006.01)
(52) U.S. Cl.
CPC .......... H04L 1/1657 (2013.01); H04L 5/0055 (2013.01)

(58) Field of Classification Search
None
See application file for complete search history.

(56) References Cited

U.S. PATENT DOCUMENTS

| | | | |
|---|---|---|---|
| 8,483,624 B2 | 7/2013 | Cai et al. | |
| 10,064,133 B2 | 8/2018 | Berntsen et al. | |
| 2003/0063691 A1 | 4/2003 | Shiozawa et al. | |
| 2005/0135248 A1 | 6/2005 | Ahuja et al. | |
| 2005/0153735 A1* | 7/2005 | Morioka ................. | H04L 69/22 |
| | | | 455/552.1 |
| 2008/0080375 A1* | 4/2008 | Haruta .................... | H04L 69/22 |
| | | | 370/235 |
| 2012/0220228 A1 | 8/2012 | Tandai et al. | |
| 2013/0114448 A1 | 5/2013 | Koo | |
| 2014/0098761 A1 | 4/2014 | Lee et al. | |
| 2017/0310628 A1 | 10/2017 | Norwood et al. | |
| 2019/0222970 A1 | 7/2019 | Shan et al. | |

* cited by examiner

*Primary Examiner* — Hong S Cho
(74) *Attorney, Agent, or Firm* — Slater Matsil, LLP

(57)          ABSTRACT

A method of controlling a receiver of radio frequency communications includes intervals between the reception of a data packet header and an acknowledgement sent by the receiver being constant, and, once a packet has been correctly received, circuits of the receiver are put into standby for a duration corresponding to the interval after each reception of a header of same rank as that of the correctly received packet.

20 Claims, 3 Drawing Sheets

1

SYSTEMS AND METHODS FOR CONTROLLING RADIO FREQUENCY COMMUNICATION RECEIVERS

CROSS-REFERENCE TO RELATED APPLICATIONS

This application claims the priority benefit of French Patent Application No. FR2303076, filed on Mar. 30, 2023, entitled "Procédés de commande de récepteurs de communications radiofréquences," which is hereby incorporated herein by reference to the maximum extent allowable by law.

TECHNICAL FIELD

The present disclosure generally concerns radio frequency communication systems and methods. The present disclosure more particularly concerns radio frequency communication receivers and methods.

BACKGROUND

Communications between a transmitter and a receiver of radio frequency communications may be unstable. Usual communication protocols thus provide the repeated sending of a same data packet by the transmitter until it is received by the receiver.

Current protocols however cause a significant energy consumption by the receiver.

SUMMARY

There is a need to improve radio frequency communication methods and receivers.

There is in particular a need for a radio frequency communication method enabling to save the energy consumed by the receivers as well as for receivers implementing such a method.

An embodiment overcomes all or part of the disadvantages of known methods and receivers.

One embodiment provides a method of controlling a receiver of radio frequency communications where intervals between the reception of a data packet header and an acknowledgement sent by the receiver are constant, in which method, once a packet has been correctly received, circuits of the receiver are put into standby for a duration corresponding to the interval after each reception of a header of same rank as that of the correctly received packet.

One embodiment provides a receiver of radio frequency communications where intervals between the reception of a data packet header and an acknowledgement sent by the receiver are constant, in which receiver, once a packet has been correctly received, circuits are put into standby for a duration corresponding to the interval after each reception of a header of same rank as that of the correctly received packet.

According to an embodiment, after each reception of a header having a rank different than that of the correctly received packet, the circuits of the receiver remain active during at least part of the corresponding interval.

According to one embodiment, the data packet of each of the intervals is arranged in a protocol data unit.

According to one embodiment, the intervals have a size greater than a maximum predetermined size of protocol data units.

According to one embodiment, each of the intervals comprises a clock adjustment time between the protocol data unit and the acknowledgement sent by the receiver.

According to one embodiment, during the adjustment time, the circuits of the receiver are set to standby.

According to one embodiment, the circuits of the receiver are active for the sending of the acknowledgement.

One embodiment provides a radio frequency communication system comprising a first communication module configured to transmit data packets having a header indicating their respective rank, and a second communication module configured to implement a method as disclosed above.

One embodiment provides a system, wherein the first module is also configured to implement the method as disclosed above.

According to one embodiment, the first module and the second module are identical.

According to one embodiment, the first and/or the second modules comprise a radio frequency signal transmission block and a radio frequency signal reception block.

According to one embodiment, the signal transmission block and the reception block, of the first and/or the second module, are coupled to a respective antenna via a switch coupling the antenna now to the transmission block, now to the reception block.

According to one embodiment, the first and/or the second modules comprise a buffer data storage module configure to store an acknowledgement and/or data packets.

BRIEF DESCRIPTION OF THE DRAWINGS

The foregoing and other features and advantages of the present invention will be discussed in detail in the following non-limiting description of specific embodiments and implementation modes in connection with the accompanying drawing.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments and implementation modes have been shown and are detailed.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made, unless specified otherwise, to the orientation of the figures.

Unless specified otherwise, the expressions "around," "approximately," "substantially" and "in the order of" signify within 10%, and preferably within 5%.

Figure 1:
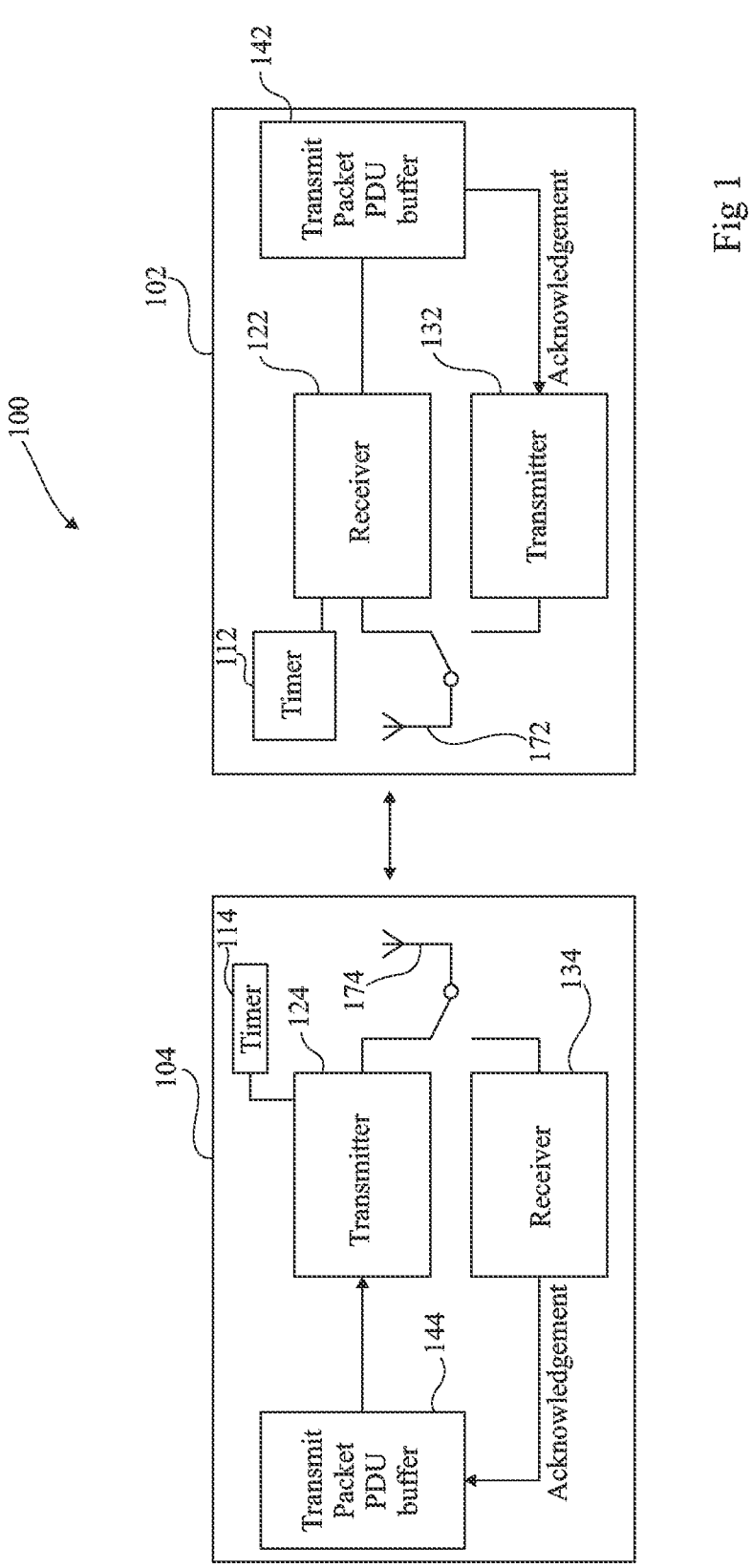
FIG. 1 very schematically shows an example of a radio frequency communication system of the type to which the described embodiments apply.

FIG. 1 very schematically shows an example of a radio frequency communication system of the type to which the described embodiments apply.

System 100 comprises a first 104 and a second 102 communication modules configured to exchange data in bidirectional fashion.

In the shown example, module 102 and module 104 are each configured to be used either in a data transmission mode, or in a data reception mode. However, it is possible to envisage for one of the modules to only be a data transmitter and for the other module to only be a data receiver.

In the present disclosure, the transmitted data are indifferently called "data" and "data packets."

Module 102 and module 104 each comprise a radio frequency signal transmission block (Transmitter) 132, respectively 124, a radio frequency signal reception block (Receiver) 122, respectively 134, coupled to an antenna 172, respectively 174 via a switch coupling the antenna, now to the transmission block, now to the reception block. The transmission and reception blocks of each module are coupled to a time counter (TIMER) 112, respectively 114 enabling among others to synchronize them or also to count the different times allocated to each data transmission frame, such as provided by the implemented radio frequency protocol. The radio frequency signal transmission block 132, respectively 124, and the radio frequency signal reception block 122, respectively 124, of each module 102, 104, are coupled together via a buffer data storage module (Receive Packet PDU buffer, in the case of a data reception, Transmit Packet PDU buffer, in the case of a data transmission) 142, respectively 144. The data, received by the reception block and transmitted to the buffer storage module comprise, for example, an acknowledgement of receipt of data (Acknowledgement) coming from the other module.

By default, the two modules are in a data reception or scan mode. When one of the two modules desires to transmit data, it is switched to the data transmission mode.

The implemented radio frequency communication protocol comprises successive frames of constant duration. These frames are for example formed of a first duration or field during which a data header is sent. The header for example contains a data rank and indexes the data or data packets according to their rank, in other words according to their sequence number (sequence N, sequence N+1, etc.). The first duration is followed, for example, by the sending of a protocol data unit (PDU), comprising the data packets, and then by a possible response wait delay after which a similar frame or a frame corresponding to another protocol data unit rank is sent. The data packets sent, in other words transmitted, for adjacent frames, may be identical if the reception of these data packets is not confirmed by the module which is supposed to receive them or if the reception is not effective. In another example, the communication protocol provides that, during a plurality of successive adjacent frames, data of same rank are re-transmitted, whether they are correctly received or not. In an example, when the transmitted packets are received correctly, an acknowledgment is for example sent to the transmitter module and the data sent in the next frame are those of the next protocol data unit rank.

The data or data elements contained in the protocol data unit for example contain the data and data control elements such as a cyclic redundancy code (CRC) or a check sum.

The receiver unit first reads the header of each data packet to determine the rank of this data packet. When the data packets of a given rank are correctly received by the receiver unit, the transmission block of the receiver module sends an acknowledgement to the other module. If the acknowledgement is not received in the corresponding provided interval, by the module which has sent the data packets of the same rank, the transmitter module retransmits data packets having the same rank and this, until it receives the corresponding acknowledgement. For example, as long as the transmitter receives no acknowledgement from the receiver testifying the correct reception of the data of a given rank, the data of same rank are re-transmitted.

There will be designated hereafter by "interval" the time interval between the reception of the header by the receiver and the sending of the acknowledgement by this receiver. This interval is set by the transmission protocol implemented by the transmit-receive system and is constant.

At each sending of data packets by the transmitter unit, circuits of the receiver read and decode the header of the received data packet. These circuits remain active until the sending of the acknowledgement by the receiver with possibly a temporary deactivation of the receiver between the reception of the protocol data unit and the sending of the acknowledgement.

In the case where the transmitter has already sent data of a given rank and has not received the acknowledgement, then this same data packet will be re-transmitted and the receiver will remain active to receive a data packet which has thus already been received first. In this case, the fact for the receiver circuits to remain active causes an energy decrease a priori useless while the useful data have themselves already been received correctly.

According to the described embodiments, it is provided to implement a setting to standby or a deactivation of circuits of the receiver for a duration corresponding to the constant interval once a data packet has been correctly received and after each reception of a header of same rank as that of the correctly received packet. The energy consumption at the receiver level is thus considerably decreased.

Figure 2:
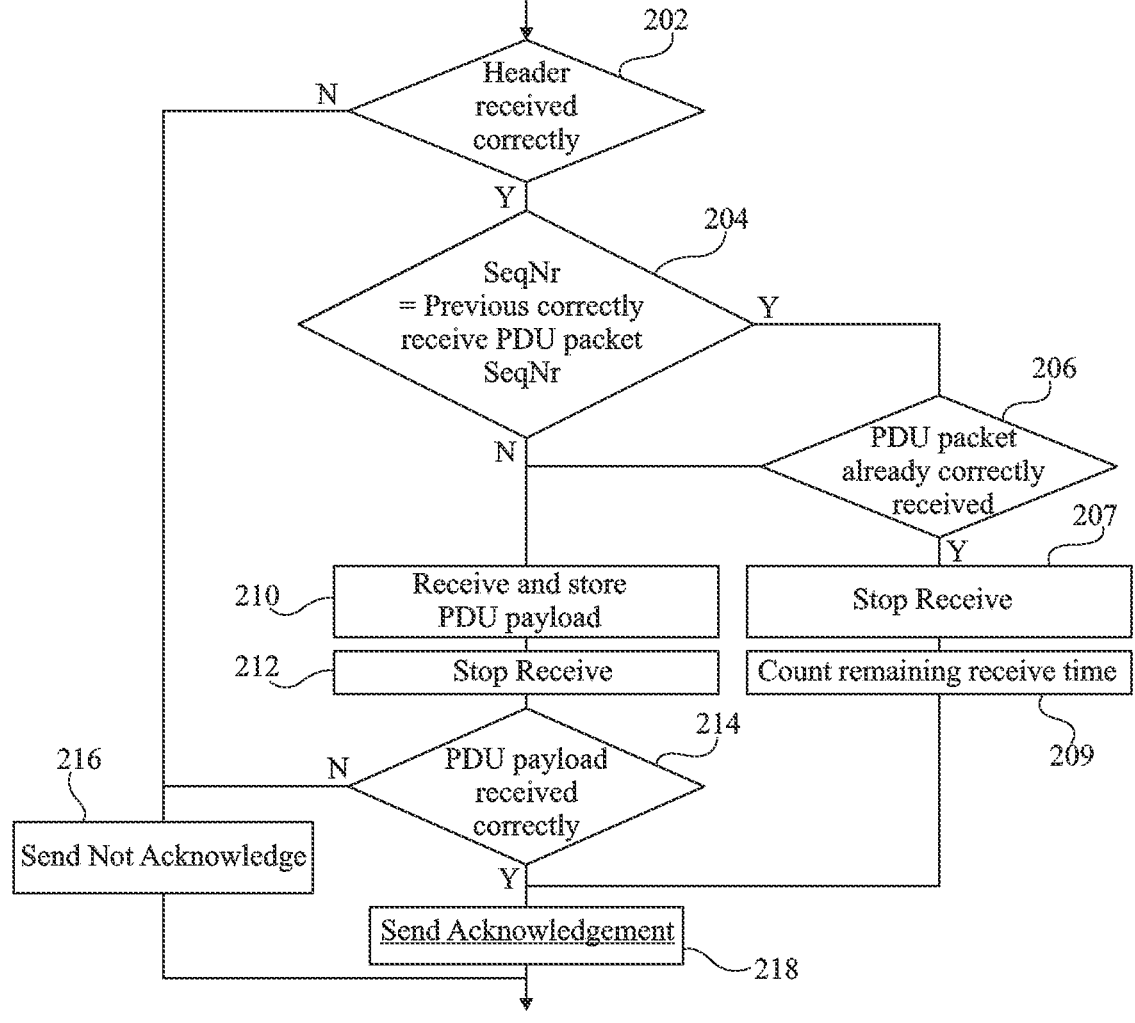
FIG. 2 illustrates, in the form of a flowchart, an implementation mode of radio frequency communication method.

FIG. 2 illustrates, in the form of a flowchart, an implementation mode of a radio frequency communication method.

Steps 202, 204, 210, 212, 214, 216, and 218 describe an operation of the receiver according to which a protocol data unit of a given rank is received by the receiver for the first time.

Steps 206, 207, and 209 described an operation of the receiver when a protocol data unit of a given rank has already been received by the receiver at least once.

At a step 202 (Header received correctly), it is verified whether the header of the received packet has been correctly received by the receiver.

If it has, branch "Y," the receiver sends an acknowledgement and the method proceeds to step 204 (SeqNr=Previous correctly receive PDU packet SeqNr).

If not, branch "N," the method proceeds to step 216 (Send Not Acknowledge).

At step 204, the rank of the data packet linked to the received header is read and for example noted SeqNr. If rank SeqNr is the same as that of the header previously received, then branch "Y" is taken towards step 206 (PDU packet already correctly received).

In the opposite case, branch "N" is followed to implement step 210 (Receive and store PDU payload).

At step 210, the data packet contained in the protocol data unit is received, read, and stored by circuits of the receiver, for example, towards buffer 142.

Then, the receiver is stopped or set to standby during a step 212 (Stop receive) between the end of the reception of the protocol data unit and the sending of the acknowledgement by the receiver.

After step 212, a step 214 (PDU payload received correctly) comprises verifying whether the protocol data unit of rank SeqNr has been correctly received. If it has not (branch N), a step 216 (Send Not Acknowledge) is carried out by sending, from the receiver, a message indicating the poor reception of the protocol data unit. If it has (branch "Y"), a step 218 (Send Acknowledgement) is carried out by sending an acknowledgement with the receiver.

At step 206, if the protocol data unit of rank SeqNr has already been correctly received during the previous interval, then branch "Y" is taken until step 207 (Stop receive). In this case, the protocol data unit of same rank is not stored again in buffer 142.

In the opposite case, branch "N" is followed to implement step 210.

At step 207, circuits of the receiver or the entire receiver are deactivated or set to standby and step 209 (Count remaining time) is carried out.

At step 209, a counter, for example, counter 112, determines the time during which circuits of the receiver or the entire receiver remain deactivated until the sending of an acknowledgement. This deactivation time for example starts after the reading of the header.

The deactivation time is for example constant and can be predetermined in the communication protocol according to a maximum authorized length of the protocol data unit. The deactivation time for example starts after the reading of the header. The predetermined deactivation time is for example greater than the maximum authorized length of the protocol data unit while being shorter than the time provided in the protocol between the end of the header and the sending of the acknowledgement. The deactivation time for example comprises an adjustment time (Delay to Ack), after the duration corresponding to the reception of the maximum length (duration) of the protocol data unit authorized by the protocol, until the time provided in the protocol for the sending of the acknowledgement. The adjustment time is for example used to take into account clock frequency variations between the receiver and the transmitter which may be in the order of 80 parts per million (ppm). The duration corresponding to the length of the protocol data unit is obtained by multiplying the length of the protocol data unit, expressed in bits, by the bit rate per second.

In another example, the deactivation time period starts after the reading of the header and has a duration, counted from the end of the header, corresponding to the length of the protocol data unit of same rank which has already been received in a previous interval. In this example, the receiver may be woken up or reactivated after the duration corresponding to the length of the protocol data unit of same rank which has already been received in a previous interval and after for example an adjustment time (Delay to Ack) until the time provided in the protocol for the sending of the acknowledgement.

At the end of step 209, step 218 is implemented by sending an acknowledgement with the receiver.

Steps 206 to 209 enable to receive only once the protocol data unit of a given rank, which enables to save the energy consumed by the receiver.

Figure 3:
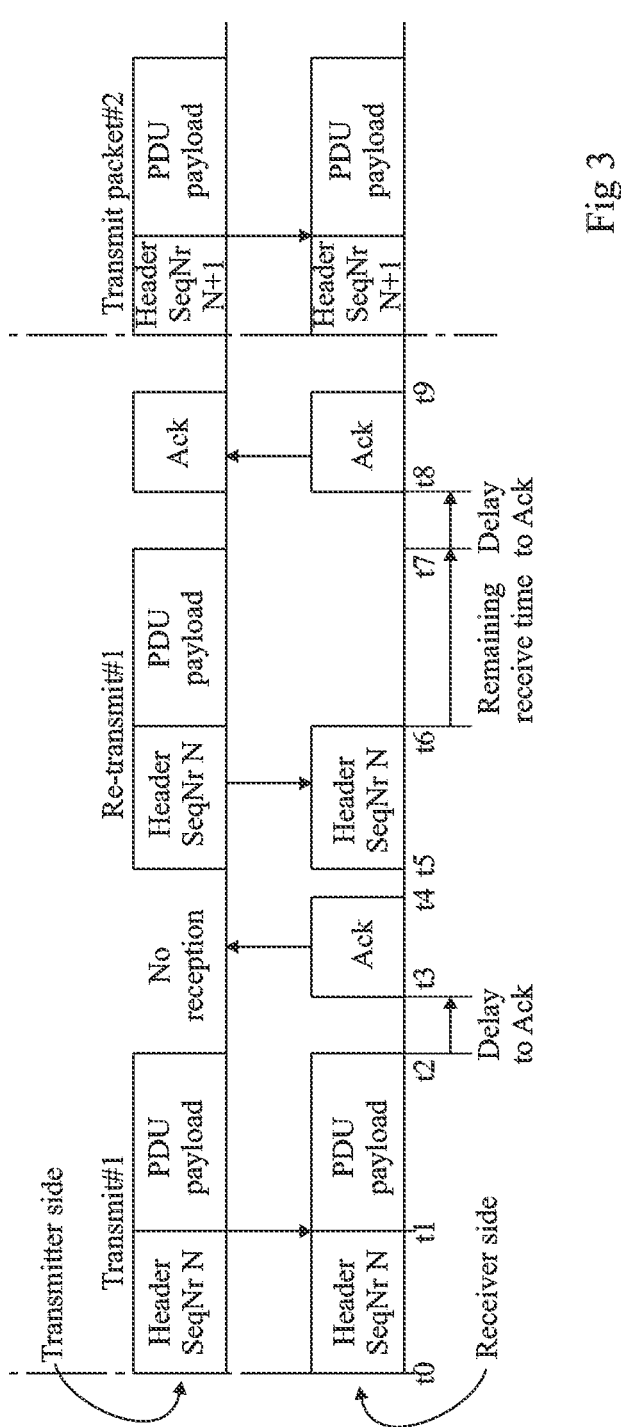
FIG. 3 shows, in the form of a flowchart, an implementation mode of radio frequency communication method.

FIG. 3 shows a timing diagram of a communication method according to an embodiment.

More precisely, FIG. 3 shows an example of a radio frequency communication between two communication modules (Transmitter side, Receiver side).

At a given time to until a time t1, the header (Header SeqNr N) of a protocol data unit (PDU payload) of rank N is sent by a module in transmitter mode to a module in receiver mode.

Between time t1 and a subsequent t2, the protocol data unit is also sent by the transmitter and correctly received by the receiver.

Between time t2 and a time t5, the transmitter is configured to wait for and/or receive a response from the receiver.

Between time t2, which corresponds to the end of the reception of the protocol data unit of rank N and a subsequent time t3, the receiver is for example deactivated to comply with the adjustment time (Delay to Ack).

Between time t3 and a subsequent time t4, prior to a time t5, the receiver is reactivated and it returns an acknowledgment (Ack). However, in the example of FIG. 3, the transmitter, waiting for the response of the receiver, does not receive this acknowledgment (No reception).

Between times t4 and t5, a buffer period is provided to for example overcome clock frequency differences between transmitter and receiver.

The example of FIG. 3 between successive times to and t5 corresponds to the sequence of the steps of FIGS. 2, 202, 204, 210, 212, 214, and 218. The example of FIG. 3 between successive times t5 and to corresponds to the sequence of the steps of FIGS. 2, 202, 204, 206, 207, 209, 214, and 218.

The interval between times to and t5 corresponds to a first data transmission attempt. Since the transmitter does not receive the acknowledgement, it will re-attempt to re-transmit the same protocol data unit (Re-transmit #1).

For this purpose, at time t5 and until a subsequent time t6, the header (Header SeqNr N) of the protocol data unit (PDU payload) of rank N is retransmitted by the module in transmitter mode to the module in receiver mode. After the reading and the identification of the rank N of the header by the receiver, the receiver or part of the circuits thereof are deactivated until a time t7 (remaining receive time) and, after having complied with the adjustment time (Delay to Ack) between time t7 and a time t8, a new acknowledgement is sent by the receiver reactivated between time t8 and a time t9.

The protocol data unit of rank N having already been received during the first interval (transmit #1), the receiver, which is reactivated during the re-transmitting of the already-received data unit, does not have to use energy to receive an already-received protocol data unit.

At time t8, the receiver is reactivated so that a new acknowledgment (Ack) is retransmitted by the receiver and received this time by the transmitter. The receiving of the acknowledgement by the transmitter causes, after time t9, the sending of the header and of a protocol data unit of next rank N+1 (Transmit packet #2).

Various embodiments and variants have been described. Those skilled in the art will understand that certain features of these various embodiments and variants may be combined, and other variants will occur to those skilled in the art. In particular, the protocol may provide a systematic repeating of the sending of protocol data unit of a same rank. In this case, the discussed method enables, for each repetition of the sending of the same protocol data unit, to deactivate the receiver.

The example of FIG. 3 graphically shows the sending and the receiving of the protocol data units or also the sending and the receiving of the acknowledgements as being simultaneous, however those skilled in the art will understand that there is a certain delay in time between the transmission and the reception.

Finally, the practical implementation of the described embodiments and variations is within the abilities of those skilled in the art based on the functional indications given hereabove. In particular, as for the implementation of the adjustment time, the latter may be optional or adjusted according to the clock technologies used.

What is claimed is:

1. A method of controlling a receiver of radio frequency communications, the method comprising:

sending acknowledgements at constant intervals after receiving respective data packet headers; and in response to correctly receiving a packet, putting circuits of the receiver into standby for a duration corresponding to the interval after each reception of a header of same rank as that of the correctly received packet.

2. The method according to claim 1, further comprising, after each reception of a header having a rank different than that of the correctly received packet, keeping active the circuits of the receiver during at least part of the corresponding interval.

3. The method according to claim 1, further comprising arranging a data packet of each of the intervals in a protocol data unit.

4. The method according to claim 3, wherein the intervals have a size greater than a maximum predetermined size of protocol data units.

5. The method according to claim 4, wherein each of the intervals comprises a clock adjustment time between the protocol data unit and the respective acknowledgement sent by the receiver.

6. The method according to claim 5, further comprising putting the circuits of the receiver into standby during the clock adjustment time.

7. The method according to claim 1, further comprising activating the circuits of the receiver for the sending of the acknowledgements.

8. A communication module configured for radio frequency communications, the communication module comprising:

a receiver configured to receive data packet headers; and a transmitter communicatively coupled to the receiver and configured to send acknowledgements at constant intervals after the receiver receives the respective data packet headers;

the receiver further configured to, in response to correctly receiving a packet, put circuits of the receiver into standby for a duration corresponding to the interval after each reception of a header of same rank as that of the correctly received packet.

9. The communication module according to claim 8, wherein, after each reception of a header having a rank different than that of the correctly received packet, the circuits of the receiver remain active during at least part of the corresponding interval.

10. The communication module according to claim 8, wherein a data packet of each of the intervals is arranged in a protocol data unit.

11. The communication module according to claim 10, wherein the intervals have a size greater than a maximum predetermined size of protocol data units.

12. The communication module according to claim 11, wherein each of the intervals comprises a clock adjustment time between the protocol data unit and the respective acknowledgement sent by the receiver.

13. The communication module according to claim 12, wherein during the clock adjustment time, the circuits of the receiver are put into standby.

14. The communication module according to claim 8, wherein the circuits of the receiver are active for the sending of the acknowledgements.

15. A radio frequency communication system comprising:

a first communication module configured to transmit data packets each having a data packet header indicating their respective rank; and a second communication module comprising a receiver and configured to:

send acknowledgements at constant intervals after receiving respective data packet headers; and in response to correctly receiving a packet, put circuits of the receiver into standby for a duration corresponding to the interval after each reception of a header of same rank as that of the correctly received packet.

16. The radio frequency communication system according to claim 15, wherein the first communication module comprises a second receiver, and is configured to:

send second acknowledgements at second constant intervals after receiving respective second data packet headers; and in response to correctly receiving a second packet, put second circuits of the second receiver into standby for a second duration corresponding to the second interval after each reception of a second header of same rank as that of the correctly received second packet.

17. The radio frequency communication system according to claim 15, wherein the first communication module and the second communication module are identical.

18. The radio frequency communication system according to claim 15, wherein the first and/or the second communication modules comprise a radio frequency signal transmission block and a radio frequency signal reception block.

19. The radio frequency communication system according to claim 18, wherein the radio frequency signal transmission block and the radio frequency signal reception block, of the first and/or the second communication module, are coupled to a respective antenna via a switch coupling the respective antenna alternatingly to the radio frequency signal transmission block and the radio frequency signal reception block.

20. The radio frequency communication system according to claim 15, wherein the first and/or the second communication modules comprise a buffer data storage module configured to store the acknowledgements and/or the data packets.

\*     \*     \*     \*     \*